Sept. 8, 1959 W. PAUL 2,902,906
TUBE MANUFACTURING MACHINES
Filed Oct. 31, 1955 4 Sheets-Sheet 1

Inventor:
W. Paul
By Glascock Downing Seebold
Attys.

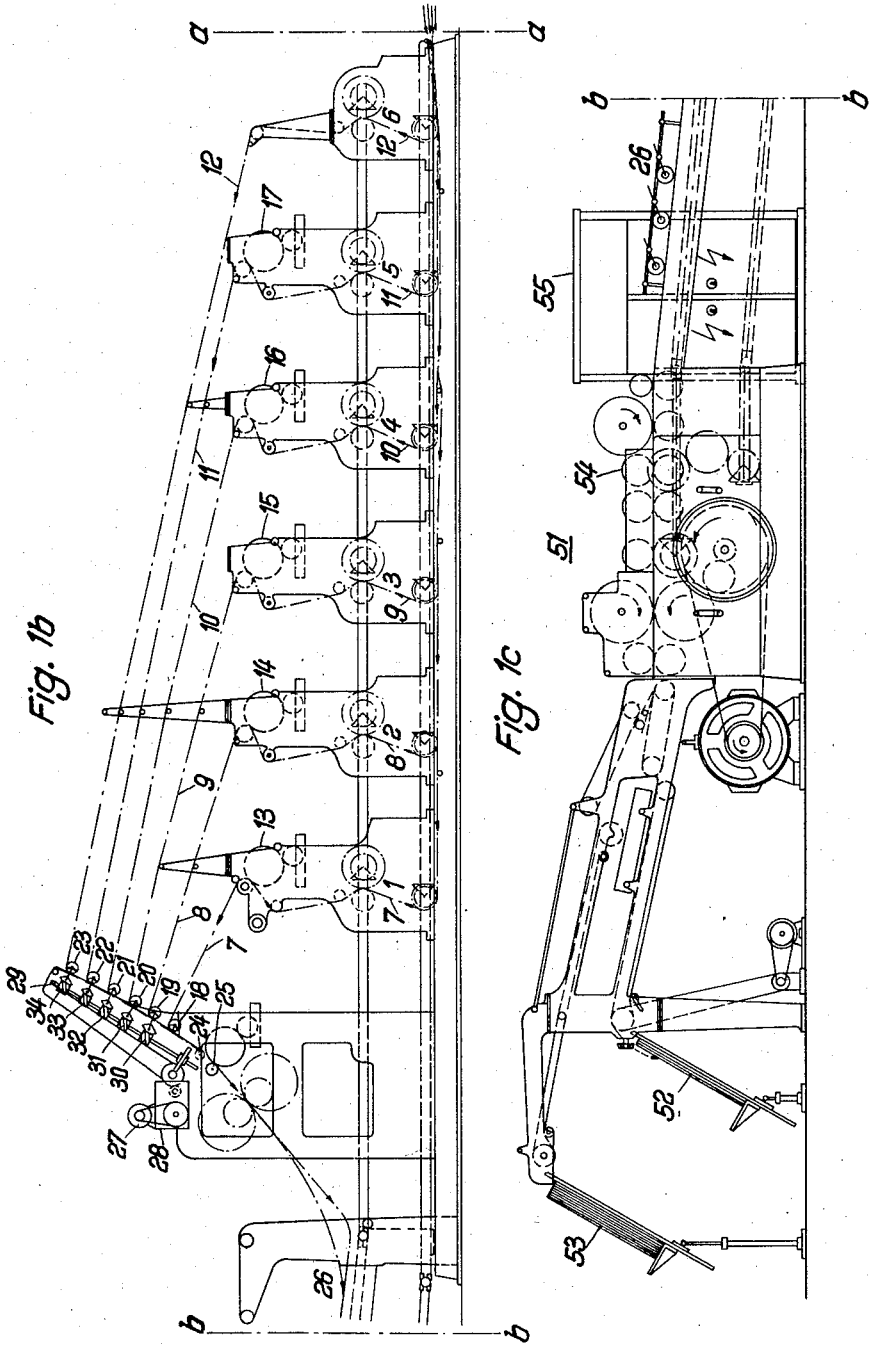

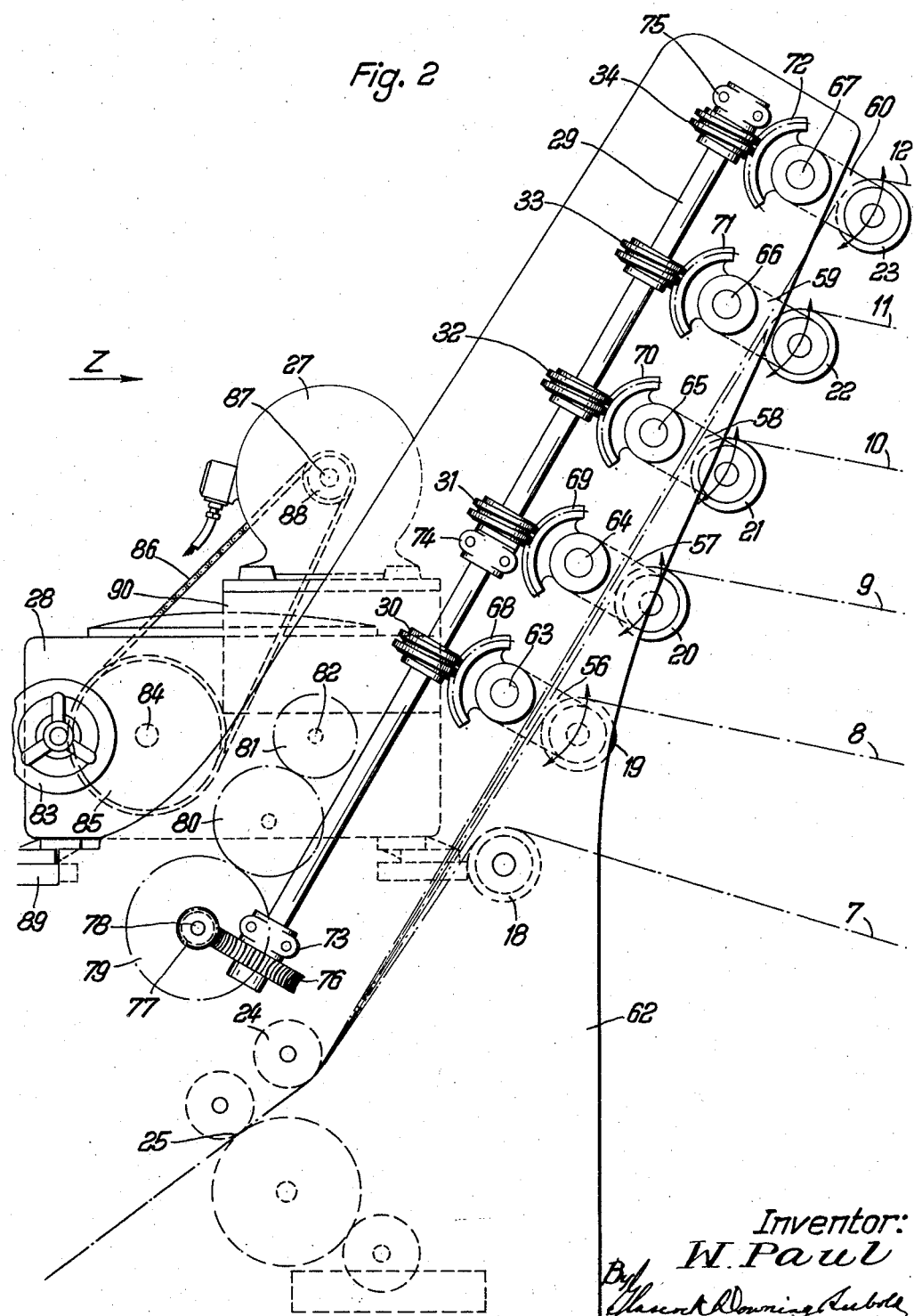

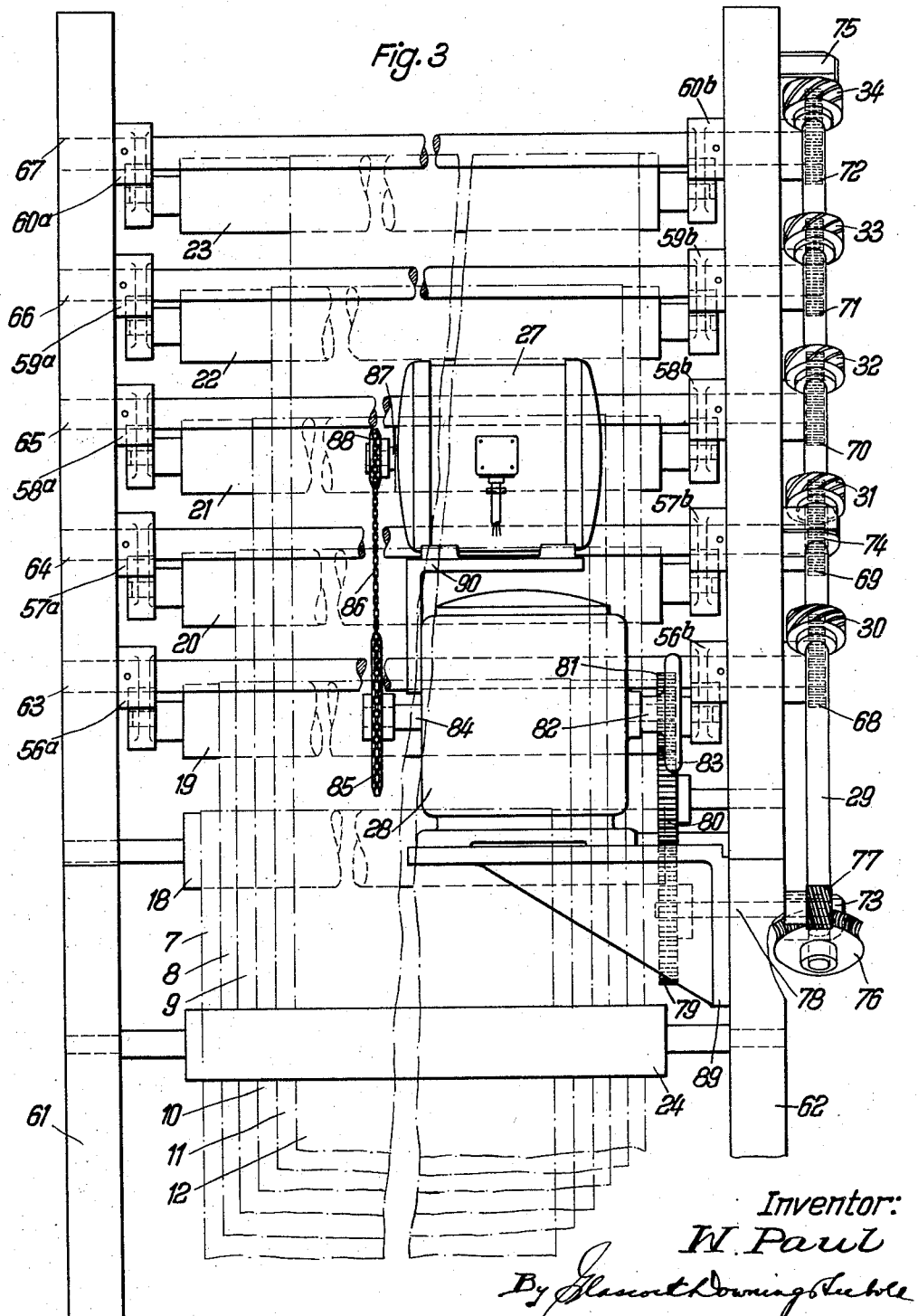

United States Patent Office 2,902,906
Patented Sept. 8, 1959

2,902,906

TUBE MANUFACTURING MACHINES

Walter Paul, Lengerich, Westphalia, Germany, assignor to Windmöller & Holscher, Lengerich, Westphalia, Germany, a German firm Application October 31, 1955, Serial No. 543,935

Claims priority, application Germany November 2, 1954

4 Claims. (Cl. 93—19)

The manufacture of tubes composed of several layers of material, with the layers staggered at the ends and made of continuous webs of paper or the like, is done by means of tube manufacturing machines in such a way that tearing lines are provided in the various webs before they are combined to a combined web, and the combined web is then converted into a continuous tube and glued, and finally individual sections of the tube with the layers of material staggered at the end are torn off the continuous tube at the corresponding staggered tearing lines.

The staggered arrangement of the tearing lines in the continuous tube is achieved by the perforating units carrying out the perforation of the individual webs in the corresponding sequence.

In the use of a pre-printed paper web for the outer layer of the tube the method of controlling the feeding speed of all webs jointly and automatically, for instance, by means of a photo-electric cell control equipment, in order to ensure that the tearing lines are arranged in accordance with the spacing of the printed matter, is known. In this case the printed web is subjected to a detecting process, for instance, by means of special printed marks and a photo-electric device, and any response of the control device has the consequence of giving the feeding speed of all webs a temporary larger and a permanent smaller common change.

In order to maintain the prescribed mutual staggering of the tearing lines in the staggered ends of tube sections, as established by the initial setting of the machine, it is essential that only those tearing line intervals, which later are brought to coincide in the same multi-ply tube section, shall be affected simultaneously by the changing of tearing line intervals corresponding to the tube length; such changing, of course, can result either from (a) a temporary change in feeding speed which is of relatively greater magnitude, or (b) a more permanent change in feeding speed which is of relatively smaller magnitude. If, upon adjustment of the feeding speed, there is brought about a simultaneous change in the tearing line intervals of certain webs, which intervals later do not coincide in one and the same section of multi-ply tube, then the temporary greater correction (a) leads to errors in the degree of staggering of some of the multi-ply tube sections. This is the case, for example, in tube forming machines in which the sequentially arranged perforating devices are at different distances from the combining roller, and is due to the fact that the temporary speed adjustment, which affects only one tube length (as respects the interval between two tearing lines) so far as any individual web is concerned, is later carried over into several multi-ply tube sections. Thus, the changed length of the web portion forming the outermost ply lies in a first tube section, and the changed length of the web portion forming the next-to-outermost ply lies in the succeeding tube section, and so on, because of the longer travel distance. However, these deviations in the stagger distances can be tolerated.

But the deviations which result from the permanent speed change (b), though smaller in magnitude, lead to errors in all of the succeeding multi-ply tube sections. This is because the latter change is introduced into different successive multi-ply tube sections, in turn due to the differences in the distances from the individual perforating devices, for the respective webs, to the combining roller. Since the error in stagger distance is effective as to all succeeding tube lengths, it will increase with each following adjustment of the speed, and will soon lead to intolerable deviations in the desired stagger distances.

In order to avoid this inconvenience, staggered tube section machines have already been made, where the lengths of the paper web between the various perforating units and the combining roller are accurately equal, so that corrections in the feeding speed affect simultaneously only those tearing lines which are related to one tube. For this purpose the perforating units, whose number is normally 6, are arranged substantially vertically above each other. But this design has important disadvantages mainly with regard to the accessibility of the upper perforating units, but also as far as the stability of their support, their drive and the general arrangement of the machine is concerned.

The present invention solves the problem of maintaining equal staggering distances at the ends of the tube sections, in machines having varying web length distances from the perforating devices to the combining roller, substantially by compensating for the deviations in the staggered distances, which occur normally and permanently in this type of machine, by means of an automatic regulating device. Consequently, it does not matter if the paper web lengths between the perforating unit and the combining roller are not the same, and the perforating units are arranged horizontally one behind the other at a low height above the ground, so that they are all easily accessible, well supported and the drive does not present any difficulties. The invention includes also a preferred regulating device of this kind and is described below in detail by means of drawings, which show the corresponding part of a tube manufacturing machine equipped according to the invention.

In order that the invention may be clearly understood and readily carried into effect, the same will now be described more fully with reference to the accompanying drawings, which show the appropriate part of a tube manufacturing machine equipped according to the invention.

Figs. 1a, 1b and 1c are views of a tube manufacturing machine according to the invention illustrated in three consecutive portions.

Fig. 1a shows the rear part of the tube manufacturing machine extending to the vertical section line a—a.

Fig. 1b shows the middle part of the tube manufacturing machine extending from the vertical section line a—a to the section line b—b.

Fig. 1c shows the front part of the tube manufacturing machine beginning at the vertical section line b—b.

Fig. 2 is a view in an enlarged scale of that part of the machine which is the object of the invention.

Fig. 3 is a view of the same part of the machine shown in Fig. 2, but seen in the direction of arrow Z on Fig. 2.

Figure 1A:
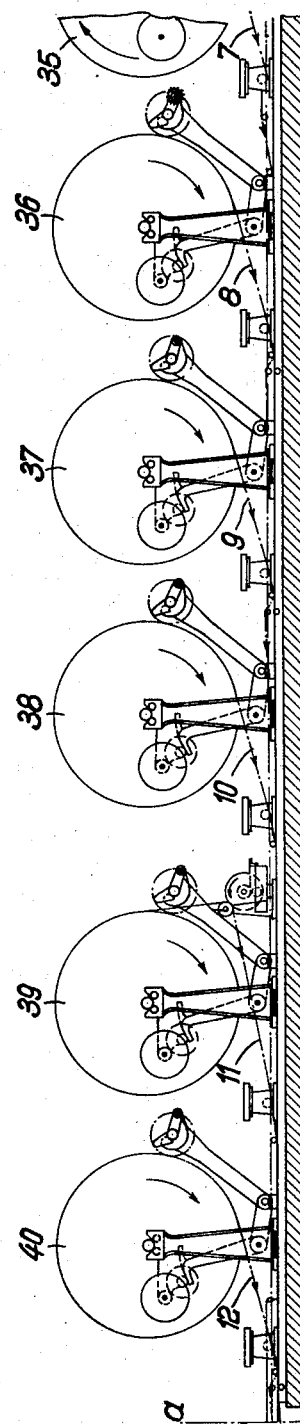

The numbers 1 to 6 in Fig. 1b denote the perforating units, which are already known, and to which 6 webs of paper, 7 to 12, are admitted from six take-off rolls 35 to 40 shown in Fig. 1a; the direction of motion of paper is indicated by the arrows. The paper webs 7 to 11 pass from the perforating units each to one transverse glueing device 13 to 17, of an already known type. Here transverse glueing strips are applied on both sides of the tearing lines produced in the perforating units, so that the various layers can be glued later in the walls of the tube section ends.

From the transverse glueing devices 13 to 17 and the perforating unit 6 the individual paper webs 7 to 12 are taken over rollers 18 to 23, the rollers 19 to 23 of which are adjustable, as is also already known per se. For this purpose the rollers 19 to 23 are each supported in pairs of levers 56 to 60 respectively, as shown best in Figs. 2 and 3. The paper webs are now combined to a combined web on the combining roller 24. The combined web is converted in a known manner to a continuous tube, by applying longitudinal glueing strips at 25 and folding the web over in a tube forming unit at 26. Individual sections of tube are torn off in a known manner in the subsequent part of the machine, which is denoted in its entirety by the numeral 51 in Fig. 1c. The tube sections are forwarded to the finished-work holding trays 52 and 53, arranged for gathering counted batches of finished articles in turns.

In the part 51 of the machine also the feeding device 54 for the paper webs is arranged; it is controlled by a photoelectric control device, lodged in the case 55, in an already known manner, so that the distances between the perforations are kept in agreement with the spacing of the printed parts on the outer layer of the tube, these printed parts being printed on the web 7. For example, special printed marks are provided for this purpose on the web 7, which are subjected to the action of a photoelectric beam. Each control process effects a temporary larger and a permanent smaller change of the feeding speed, with the consequence, that at a constant speed of rotation the perforating units produce perforations at a distance changed temporarily by a larger amount and permanently by a smaller amount along the paper webs.

As shown in the illustration, the lengths of paper webs from the individual perforating units arranged one behind the other to the combined roller are rather varying. The piece of the web 12 from the perforating unit 6 to the combining roller is, for instance, about 5 m. longer than the corresponding piece of the web 7 from the perforating unit 1 to the combining roller. It is clear that consequently the tearing lines, one per web, made during a common revolution of the perforating units, do not coincide at the same end of a tube section but are distributed over several tube ends, since they arrive at the combining roller one after the other.

Each control operation will therefore affect several tube ends consecutively, as far as the various layers are concerned. Thus, the single larger change of the tube length will appear at different tube ends as far as the various layers are concerned, and the permanent change of the tube lengths will commence at different tube ends consecutively, as far as the various layers are concerned.

If after the performance of one regulating operation to change the tube length being manufactured, the web 12 arrives at the combining roller with a changed distance between the perforations, the tube lengths have been subjected in all webs to one larger change, from the point of view of an observer stationed at the combining roller, and the tube lengths of all webs are now identical, the length having been changed permanently. But the staggered distances in the various tube section ends are no longer the same as before the control operation, due to the fact that the permanent small change in the tube lengths took effect in the various webs at points with different distances from the combining roller. Therefore, displacements occur in the tearing lines of the tube section ends according to the number of the previously effected small changes in the tube lengths, in the various webs, which at each subsequent control operation in the same direction increase and soon become excessive.

In order to avoid this inconvenience, it is proposed according to the invention to provide an automatic adjustment for the compensation of the permanent deviation in the staggered distances of the various layers in the tube ends caused by changes in the feeding speed, arising from the different distances of the perforating units from the combining roller.

A regulating device of this kind, which automatically leads to a simultaneous displacement of the tearing lines and of the transverse glue strips of the unprinted webs in a direction opposite the deviation in the stagger distances, can be arranged according to the invention so that a fixed dimensional ratio between the displacements of the individual webs is maintained, by virtue of the discovery that the displacements becoming necessary for the individual webs are always proportional to the given differences in the web lengths of the unprinted webs, compared with the length of the printed web from the perforating units to the combining roller.

The automatic regulation of the invention is brought about by means of adjusting devices providing for the extension or shortening of the paths traversed by the respective webs from their corresponding perforating devices to the common collecting roller. Preferably, this is accomplished by leading each web forming an inner (unprinted) ply over a respective roller carried between pairs of levers, to permit adjustment of the effective path length of that web by movement of such levers.

According to the invention, the drive of the regulating device is designed in such a way that the corresponding adjusting devices are displaced in proportion with the fixed ratio between the mean errors in the individual paper webs, so that a common adjustment can be carried out simultaneously for all webs.

This kind of design of the common drive of the regulating devices with a fixed ratio of the magnitudes of the displacement for the various adjusting devices can be obtained by arranging different gear ratios in the drive transmission to the various adjusting devices. Thus, for instance, worm and worm wheel transmissions with different pitches can be arranged in the drive transmission to the various adjusting devices.

The drive for the adjustment of the adjusting devices can be obtained from a special electric motor or the like, which conveniently may be of the reversible type, or from the tube manufacturing machine. It is convenient to control the drive by means of infinitely variable gearing, so that the magnitude of the common adjustment of the adjusting devices can be set initially or whenever required according to the conditions.

Since errors in the stagger distances are due only to the control processes of the control device checking the preprinted web and acting on the feeding device of the tube manufacturing machine, it is possible, according to a preferred proposal of the invention, to start the mechanical drive for the common adjustment of the adjusting devices automatically whenever the control processes begin to act on the feeding device. According to the invention, the drive is started up by the control device directly, so that the adjusting devices are adjusted together until the action of the control device on the mechanical controls of the feeding device has stopped.

In the embodiment illustrated in Figs. 2 and 3 the adjusting devices for the unprinted webs 8 to 12 show guiding rollers 19 to 23 being rotatably supported in pairs of levers 56 to 60 having equal lengths. In Fig. 3 the left hand lever of each pair of levers has been indicated with the index "a," while the right hand one shows the index "b." Each of the lever pairs 56 to 60 have been fixed to axles 63 to 67 which are supported in the side frames 61 and 62 of the machine. On the outside of the side frame 62 each of the axles 63 to 67 shows an extension onto which is fixed one of the worm wheel segments 68 to 72. Meshing with said worm wheel segments are the worms 30 to 34.

According to the invention the worm drives of the different guiding rollers, as may be seen in Fig. 2, have different pitches in accordance with fixed ratios between the differences of the individual lengths of the unprinted webs 8 to 12 and the length of the printed web 7 from their respective perforating rollers to the gathering roller. If the respective pieces of the paper webs are for instance Web 8, 1112 mm. longer
Web 9, 2197 mm. longer
Web. 10, 3285 mm. longer
Web 11, 4382 mm. longer and
Web. 12, 5240 mm. longer than the respective piece of the printed web 7, the ratio of pitches of the worm drives 30/68, 31/69, 32/70, 33/71 and 34/72 must be 1112:2197:3285:4382:5240. If all numbers are divided by 1112 the following result is obtained:

1:1.975:2.96:3.95:4.72

If the pitch of the worm drives 30/68 equals 1 the pitches of the other worm drives must be greater within a ratio of the numbers 1.975, 2.96, 3.95 and 4.72 than that one of worm drives 30/68.

The worms 30 to 34 are arranged on a common spindle 29 which is rotatably supported on the outside of frame 62 in bearings 73, 74 and 75. Fixed to the lower end of the spindle 29 is a worm wheel 76 which meshes with a worm 77. The worm 77 is fixed on a shaft 78 which is rotatably supported in the frame 62 and which is equipped with a gear 79 on the inside of the frame. The gear 79 meshes via an intermediate gear 80 with gear 81 which is fixed to the shaft 82. The shaft 82 represents the outgoing shaft of a known continuously variable gear drive 28, for instance a P.I.V. gear drive, the ratio of transmission of which may be regulated by means of the hand wheel 83. On the shaft 84 of the power input of said P.I.V. gear drive, a sprocket wheel 85 has been fastened which by means of a chain 86 is driven by a sprocket wheel 88 being fixed to the shaft 87 of an electric motor 27.

The P.I.V. gear drive 28 is mounted on a bracket 89 which in turn is fastened to the machine frame 62. The electric motor 27 is mounted to a bracket 90 which is fixed to the P.I.V. gear drive 28. The electric motor is started by the control device checking the printed paper web, and is made to rotate in one direction or the other direction, together with the mechanical controls of the feeding device, so that the entire installation operates as follows.

If there is a discrepancy in the position of the printed matter printed on the paper web in a special preceding process, this discrepancy being detected during the operation of the tube manufacturing machine on the separated tube sections, the control device checking the printed web responds and starts a control process on the feeding device of the tube manufacturing machine, so that all webs are either accelerated or retarded. Due to the fact that the webs have to move along paths of different lengths from the perforating units to the combining roller, the intended change in the distance between successive tearing lines produced by the perforating units on the various paper webs, this change being caused by the change in the feeding speed, does not affect simultaneously the tearing lines for a given tube section, so that a displacement in the various layers in the staggered tube section ends would occur, except that at the same time at which the control operation on the feeding device was started, a common displacement of the adjusting devices, the guide rollers 19 to 23 in the example shown in the illustration, was initiated by the control device starting up, for instance, the motor 27.

Due to the common adjustment of the adjusting devices by fixed ratios of the magnitudes of the displacement in the various adjusting devices, these magnitudes being determined by differences in the length of the paper webs, due to the design of the machine, and the resulting permanent errors in the staggering, the individual webs are either tensioned or slackened to a degree sufficient to ensure that the errors in the staggered distances, which would otherwise occur, are immediately and automatically compensated for. Thus the prescribed amount of stagger, apart from small transitional oscillations, is maintained.

In order to adjust the magnitude of the common displacement of the adjusting devices, the infinitely variable drive 28 is provided. Assuming the case that the mechanical control means of the feeding device, as well as the control for the adjusting members (i.e., guide rollers 19 to 23) receive their driving power from the tube machine drive, the adjustment of the stepless drive 28 is made only once, at the outset, since the adjusted values of both controls vary proportionally to the tube lengths to be produced, and remain constant for all machine speeds. Thus both remain always in the same ratio to one another and the correct error compensation automatically follows.

It will be otherwise if, as described herein, the mechanical control means of the feeding device or the adjustment of guide rollers 19 to 23, or both, received their drive power from special motors, because the latter will normally have constant speeds. In such a case it is necessary to set the stepless drive 28 for each change in the tube length being made, and probably also for each change in the machine speed.

The tube manufacturing machine according to the invention has the advantage that the perforating units are arranged so that they are easily accessible, stable, and the drive of the perforating unit is arranged conveniently, and in spite of the different lengths of the paths covered by the individual webs from the perforating units to the combining roller, the stagger of the various layers at the tube section ends, when a preprinted web with control of the feeding motion is used, is quite satisfactory.

The amounts of stagger are maintained automatically after the machine has been set.

The operation of the machine becomes particularly simple if the drive power for effecting the adjustments of guide rollers 19 to 23, as well as for the machine feed, is derived from the same source. The modifications necessary to replace the special motor 27 by a drive connection from the machine drive itself will be obvious to those skilled in the art, from what has already been said. In this case the adjustments of the feeding device and of the adjusting devices remain in proportion to each other at all tube section lengths and machine speeds, so that apart from the first setting of the infinitely variable drive no further adjustments are required.

I claim:

1. In a machine for making multi-ply tubes having the plies staggered in length at the tube ends, and of the type including a web ply combining roller, means for feeding a plurality of webs through transverse perforating devices to said combining roller, the web forming the outermost ply being imprinted, said perforating devices being at different distances from said combining roller, and register control means responsive to the indicia on said outermost ply web for controlling the machine drive to maintain the imprints on said ply properly spaced with respect to the tube lengths, the improvement which comprises automatic means for compensating for undesired changes in the degree of relative stagger in the tube ends resulting from the operation of said register control means; said automatic means comprising respective movable path-length modifying guide rollers for at least all but one of said webs, positioned between the corresponding perforating devices and said combining roller, lever means for adjusting the positions of said rollers simultaneously, and respective gear sets for adjusting said lever means, said gear sets having respectively and progressively different gear ratios to adjust said rollers in proportion to the distances from said combining roller to their corresponding perforating devices.

2. A machine in accordance with claim 1, and a common drive shaft for said gear sets.

3. In a machine for making multi-ply tubes having the plies staggered in length at the tube ends, and of the type including a web ply combining roller, means for feeding a plurality of webs through transverse perforating devices to said combining roller, the web forming the outermost ply being imprinted, said perforating devices being at different distances from said combining roller, and register control means responsive to the indicia on said outermost ply web for controlling the machine drive to maintain the imprints on said ply properly spaced with respect to the tube lengths, the improvement which comprises automatic means for compensating for undesired changes in the degree of relative stagger in the tube ends resulting from the operation of said register control means; said automatic means comprising plural path-length modifying devices for at least all but one of said webs, said devices being disposed between said perforating devices and said combining roller, means for simultaneously adjusting all of said modifying devices in proportion to the respective distances from said combining roller to said perforating devices, and means controlled by said register control means for initiating operation of said automatic means.

4. In a machine for making multi-ply tubes having the plies staggered in length at the tube ends, and of the type including a web ply combining roller, means for feeding a plurality of webs through transverse perforating devices to said combining roller, the web forming the outermost ply being imprinted, said perforating devices being at different distances from said combining roller, and register control means responsive to indicia on said outermost ply web for controlling the machine drive to maintain the imprints on said ply properly spaced with respect to the tube lengths, the improvement which comprises automatic means for compensating for undesired changes in the degree of relative stagger in the tube ends resulting from the operation of said register control means; said automatic means comprising respective movable path-length modifying guide rollers for at least all but one of said webs disposed between said respective perforating devices and said combining roller, and respective motion transmitting connections from said register control means to said guide rollers to move them simultaneously, said connections having progressively different motion transmitting ratios proportioned to the respective distances from said combining roller to said perforating devices.

References Cited in the file of this patent

UNITED STATES PATENTS

| | | |
|---|---|---|
| 2,028,145 | Coty | Jan. 21, 1936 |
| 2,078,496 | Jaite | Apr. 27, 1937 |
| 2,091,771 | Smithwick | Aug. 31, 1937 |
| 2,100,519 | Robinson | Nov. 30, 1937 |
| 2,581,801 | Lienart | Jan. 8, 1952 |